UNITED STATES PATENT OFFICE.

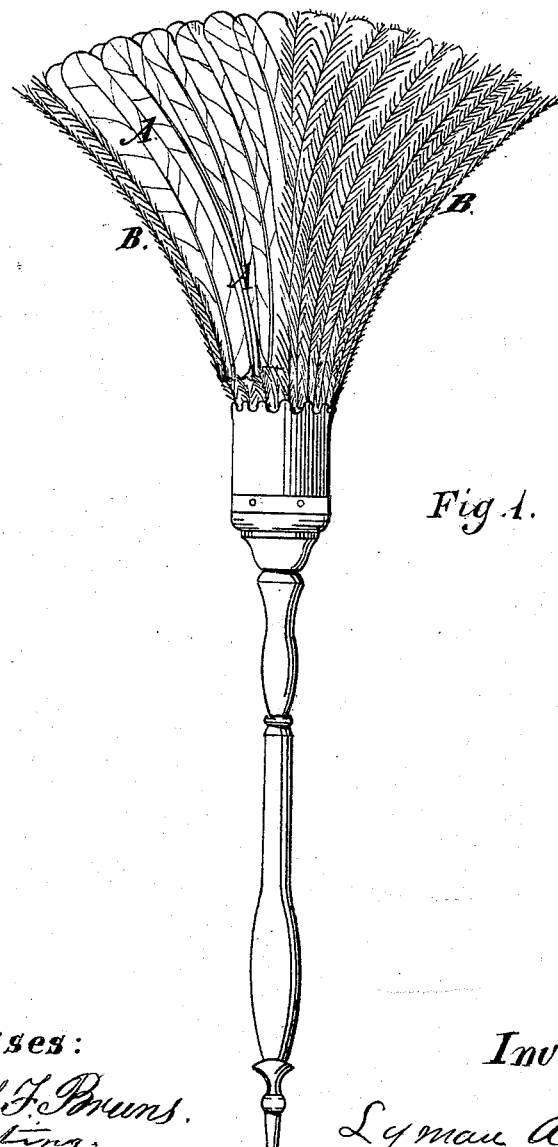

LYMAN A. STOLL, OF CHICAGO, ILLINOIS.

IMPROVEMENT IN DUST-BRUSHES.

Specification forming part of Letters Patent No. 171,488, dated December 28, 1875; application filed September 27, 1875.

*To all whom it may concern:*

Be it known that I, LYMAN A. STOLL, of Chicago, in the county of Cook and State of Illinois, have invented an Improvement in Feather Dusters, of which the following is a specification, reference being had to the accompanying drawings, which form a part hereof.

In the accompanying drawings, Figure 1 represents a side elevation of my feather duster with one side cut away.

The object of my invention is to make a feather duster the same in appearance as the feather duster made of imported feathers, and known as ostrich-feather dusters, and equally as durable, but at a much less cost, so that they can be furnished to the user much below the price of the imported-feather duster.

My invention consists in taking the long tail-feathers of American fowls, and making them limber and pliable, either by splitting the stem of the feathers or shaving out the inside pithy part of it, leaving the plumage attached to the limber or springy outside part of the feather, or by treating the stem of the feather in some chemical compound to make it pliable, and then rolling the feathers thus made pliable between iron rollers to prepare them, so that in whatever way the duster may be bent or twisted it will not break. I then take and tie to the wooden heads used in making feather dusters such a quantity of these prepared feathers as will make the duster nearly the regular size, and then cover it with the regular imported feathers of which the feather dusters commonly called "ostrich-feather dusters" are made.

A represents a prepared feather. B represents the imported feather with which the duster is covered.

The feather which I use for making the interior part of the duster, prepared as above described, is more durable than the imported feather in a feather duster, and, so far as durability goes, it would be better to make a duster entirely of these prepared feathers; but the stem of the feather A is flattened and widened by the shaving and rolling process above described, which causes it to present an uncomely and somewhat roughened appearance when left exposed upon the outside of the duster.

I put upon the outside of the duster a sufficient quantity of the imported feathers B to cover these prepared feathers on that account, and thereby make a duster which has the same appearance and the same exterior as the ordinary feather duster made wholly of the imported feathers, and a duster which is equally as good and durable.

I can make my duster at a very much less cost on account of the cheapness of the prepared feathers.

The feathers which I prepare as above described are the long tail-feathers of our domestic fowls, which have heretofore been thrown away because they were useless.

I am aware that feathers have been made pliable by the processes above described, and that feather dusters have been made wholly of these prepared feathers, and also wholly of the ostrich-feathers. I get all the beauty and softness of the latter kind, which are very expensive, by using only a covering of them, and nearly the cheapness and durability of the former kind without their roughness and unsightly appearance.

I claim—

As a new article of manufacture, a feather duster composed of a handle, the feathers prepared and made pliable, substantially as described, and a covering of ostrich or other similar feathers in their natural form, as specified.

LYMAN A. STOLL.

Witnesses:
 L. A. BUNTING,
 F. F. BRUNS.